No. 770,372. PATENTED SEPT. 20, 1904.
F. A. LAKE & C. E. HAEFNER.
MEANS FOR ADJUSTING GRAIN DRILLS, CULTIVATORS, OR LIKE IMPLEMENTS.
APPLICATION FILED APR. 16, 1904.
NO MODEL. 2 SHEETS—SHEET 2.

Witnesses
Edward P. Monroe
Georgiana Chase

Inventors
Frank A. Lake
Clarence E. Haefner
By Luther V. Moulton
Attorney

No. 770,372. Patented September 20, 1904.

UNITED STATES PATENT OFFICE.

FRANK A. LAKE AND CLARENCE E. HAEFNER, OF CASSOPOLIS, MICHIGAN, ASSIGNORS TO CASSOPOLIS MANUFACTURING COMPANY, OF CASSOPOLIS, MICHIGAN, A CORPORATION OF MICHIGAN.

MEANS FOR ADJUSTING GRAIN-DRILLS, CULTIVATORS, OR LIKE IMPLEMENTS.

SPECIFICATION forming part of Letters Patent No. 770,372, dated September 20, 1904.

Application filed April 16, 1904. Serial No. 203,428. (No model.)

*To all whom it may concern:*

Be it known that we, FRANK A. LAKE and CLARENCE E. HAEFNER, citizens of the United States, residing at Cassopolis, in the county of Cass and State of Michigan, have invented certain new and useful Improvements in Means for Adjusting Grain-Drills, Cultivators, or Like Implements; and we do hereby declare the following to be a full, clear, and exact description of the invention, such as will enable others skilled in the art to which it appertains to make and use the same.

Our invention relates to improvements in means for adjusting grain-drills, cultivators, and like implements in respect to the width of the same, whereby said implements may readily be adapted to operate between the rows of various farm products.

Said invention is more particularly intended for one-horse grain-drills adapted to operate between rows of corn.

Our invention consists, essentially, of any suitable frame having a transverse rod on which are slidably mounted a series of movable members to which are attached the draw-bars for the various drill or cultivator devices and manually-operated means for simultaneously adjusting the said members on the rod, the means shown consisting of a rock-shaft, oppositely-projecting cranks on the same, means for rotatively adjusting the rock-shaft, and connecting-rods extending from the said cranks to the various members slidable on the transverse rod, and in various novel features hereinafter described, and particularly pointed out in the claims, reference being had to the accompanying drawings, in which—

Figure 1:
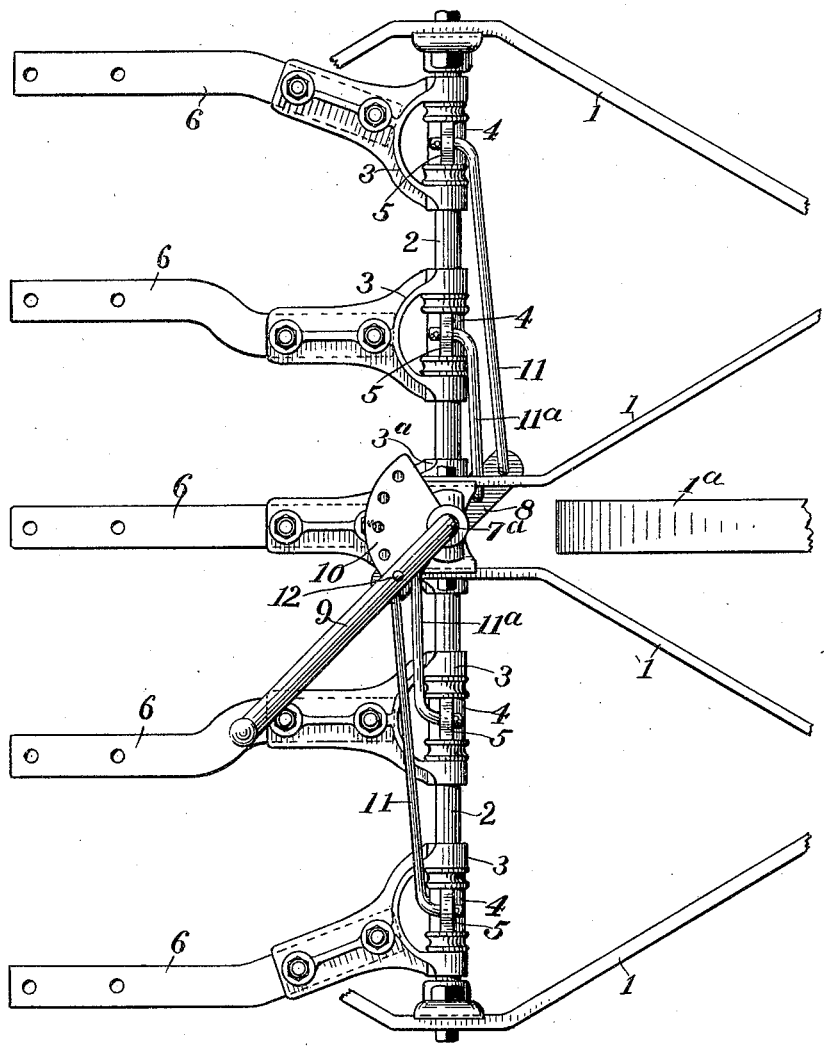
Figure 2:
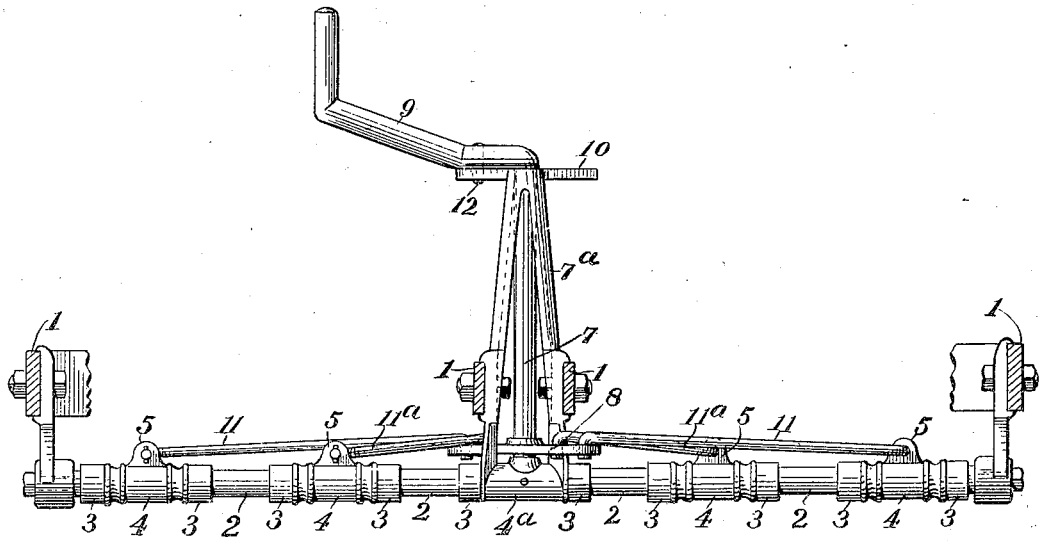
Figure 3:
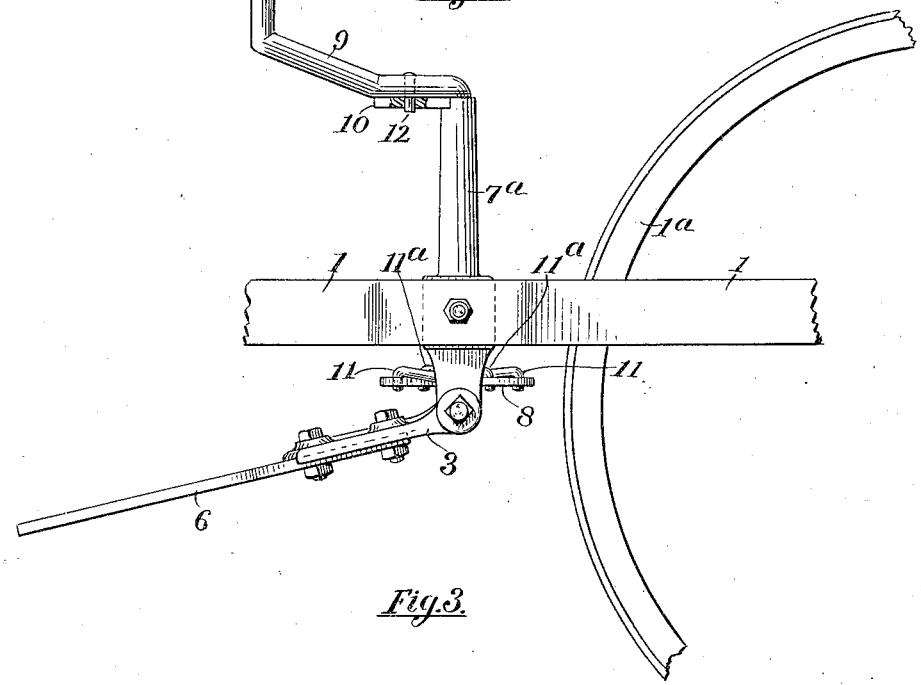

Figure 1 is a plan view of a device embodying our invention; Fig. 2, a front elevation of the same with parts removed, and Fig. 3 a side view of the same.

Like numerals refer to like parts in all of the figures.

1 represents portions of any suitable frame; 1ª, a portion of the supporting-wheel for the same; 2, a transverse rod on which are slidably and rotatively mounted a series of yokes 3, to which yokes are attached draw-bars 6, to which draw-bars are attached any convenient drill or cultivator members, as occasion may require. Within this yoke and slidable on the rod 2 are sleeves 4, having upwardly-projecting lugs 5, to which lugs are attached connecting-rods 11 and 11ª for the purpose of adjusting the sleeves and yokes longitudinally of the rod 2. The middle sleeve and yoke of this series is preferably fixed and the side members of the same adjustable toward and from the middle, as occasion requires. The connecting-rods 11 and 11ª are operated by being connected to oppositely-projecting cranks 8, mounted on a vertical rock-shaft 7, rotative in a suitable tubular support 7ª, attached to the frame, and the shaft is provided at its upper end with a handle 9, in which is a pin 12, adapted to engage a series of openings in a segment 10, projecting horizontally from the support 7ª. The shaft 7 is vertically movable sufficiently to engage and disengage this pin with the various openings in the segment, as occasion may require. The rods 11 extend to the outermost sleeves in opposite directions and are attached to the outer ends of the cranks 8, and the rods 11ª extend to the intermediate sleeves and are attached to the cranks 8 midway between the rods 11 and the axis of the shaft 7, whereby the adjustment of the inner sleeves on the rod 2 is one-half as great as that of the outer sleeves, thus maintaining the relative spacing apart of the various yokes upon the rod. We have shown a series of five yokes and draw-bars thus arranged, which arrangement is suitable for disk harrows, cultivators, or seeders, as the case may be; but it is obvious that the number of these and their arrangement may be varied and various other modifications adopted without departing from the spirit of our invention.

In operation the width of the device can be manually and instantly adjusted to conform to the particular distance between the rows of corn, as occasion may require, by changing the position of the pin 12 in the openings of the segment 10.

Having thus fully described our invention, what we claim, and desire to secure by Letters Patent, is—

1. The combination of a frame having a transverse rod, a series of movable devices on said rod, draw-bars attached to said devices, and manually-operated means for simultaneously adjusting the said movable devices to vary the distance apart of the several draw-bars.

2. The combination of a frame having a transverse rod, a series of movable devices on said rod, draw-bars attached to said devices, oppositely-projecting cranks, means for manually adjusting the cranks, and oppositely-extended rods connecting the cranks with the several movable devices.

3. The combination of a frame having a transverse rod, devices for pivotally and severally attaching a series of draw-bars to said rod, the middle device being fixed on the rod and the other devices movable toward and from the middle device, oppositely-projecting cranks, means for manually adjusting the cranks, and rods severally connecting the said devices with the cranks and at different distances from the axis of the same.

4. The combination of a frame having a transverse rod, yokes rotative and slidable on the rod, draw-bars attached to the yokes, sleeves slidable on the rod and embraced by the yokes, a crank, means for manually adjusting the crank, and rods connected to the several sleeves at one end and connected to the crank at different distances from its axis at the other end, whereby the sleeves and yokes are differently adjusted on the rod.

5. The combination of a frame having a transverse rod, movable and rotative devices on the rod, draw-bars attached to the said devices, a crank, means for manually adjusting the crank, rods respectively connected at one end to the crank and at different distances from its axis, and also connected to the respective devices at the other end.

6. The combination of a frame, a transverse rod mounted in the frame, a series of yokes pivoted and slidable on the rod, a draw-bar attached to each yoke, sleeves on the rod and embraced by the yokes, the middle sleeve being fixed on the rod and the other sleeves slidable thereon, a vertical rock-shaft, oppositely-projecting cranks on the rock-shaft, rods connecting the sleeves at one side of the middle to one crank, and rods connecting the sleeves at the other side of the middle to the other crank, a handle on the shaft, a segment having a series of openings, and a pin in the handle to engage said openings.

7. The combination of a frame, a transverse rod mounted on the frame, yokes rotative and slidable on the rod, draw-bars attached to the yokes, sleeves embraced by the yokes and slidable on the rod, a vertically-movable shaft, a handle to rotate the shaft, a segment adjacent to the handle, and having a series of openings, a pin in the handle to engage the several openings, oppositely-projecting cranks mounted on the shaft, and rods connecting the cranks and sleeves.

In testimony whereof we affix our signatures in presence of two witnesses.

FRANK A. LAKE.
CLARENCE E. HAEFNER.

Witnesses:
L. E. MAHER,
C. N. POLLOCK.